United States Patent
Woo (10) Patent No.: US 6,587,321 B2
(45) Date of Patent: Jul. 1, 2003

(54) METHODS AND SYSTEMS FOR IMPROVING ESD CLAMP RESPONSE TIME

(75) Inventor: Agnes Woo, Encino, CA (US)

(73) Assignee: Broadcom Corporation, Irvine, CA (US)

(*) Notice: Subject to any disclaimer, the term of this patent is extended or adjusted under 35 U.S.C. 154(b) by 197 days.

(21) Appl. No.: 09/903,502

(22) Filed: Jul. 13, 2001

(65) Prior Publication Data

US 2002/0030955 A1 Mar. 14, 2002

Related U.S. Application Data

(60) Provisional application No. 60/217,917, filed on Jul. 13, 2000.

(51) Int. Cl.[7] .............................. H02H 9/00; H02H 3/16
(52) U.S. Cl. ..................... 361/56; 361/91.1; 361/113
(58) Field of Search ..................... 361/56, 958, 91.1, 361/111, 113

(56) References Cited

U.S. PATENT DOCUMENTS

| | | | | |
|---|---|---|---|---|
| 3,787,717 | A | 1/1974 | Fischer et al. | 317/235 R |
| 4,385,337 | A | 5/1983 | Asano et al. | 361/91 |
| 4,423,431 | A | 12/1983 | Sasaki | 357/41 |
| 4,763,184 | A | 8/1988 | Krieger et al. | 357/23.13 |
| 5,239,440 | A | 8/1993 | Merrill | 361/91 |
| 6,437,955 | B1 * | 8/2002 | Duffy et al. | 361/113 |

FOREIGN PATENT DOCUMENTS

| | | |
|---|---|---|
| GB | 2 319 893 A | 6/1998 |
| WO | WO 00/21134 | 4/2000 |

OTHER PUBLICATIONS

Duvvury et al., "ESD Protection: Design and Layout Issues for VLSI Circuits," IEEE Transactions on Industry Application, vol. 25 No. 1, Jan./Feb. 1989, pp. 41–47.
Keller, J.K., "Protection of MOS Integrated Circuits from Destruction by Electrostatic Discharge," IIT Research Institute, 1981, pp. 73–80. (no month).
Hulett, T.V., "On Chip Protection of High Density NMOS Devices," pp. 90–96. (no date).
Protective Device, at http://www.delphion.com/tdbs/tdb?&order=85A+61057, IBM Technical Disclosure Bulletin, Apr. 1985, pp. 6814–6815.

* cited by examiner

Primary Examiner—Jessica Han
(74) Attorney, Agent, or Firm—Sterne, Kessler, Goldstein & Fox, P.L.L.C.

(57) ABSTRACT

The present invention relates to electrostatic discharge (ESD) protection and, more particularly, to methods and systems for improving response times of ESD triggering and clamping circuitry. An ESD protection circuit protects ESD circuitry from direct current (DC) voltage stress during normal operations by reducing terminal pad voltage level. A frequency bypass circuit implemented across an ESD protection circuit essentially acts as a short circuit during ESD events and essentially acts as an open circuit during normal operations. A frequency bypass circuit implemented in conjunction with an ESD protection circuit enables ESD triggering and clamping circuitry to react to ESD events without undue delay. Unlike an ESD protection circuit, a frequency bypass circuit does not result in substantial voltage reduction across its terminals. In an embodiment, the frequency bypass circuit includes one or more capacitors. For example, in an embodiment, the frequency bypass circuit is implemented as one or more discreet capacitors and/or one or more transistor-based capacitors.

21 Claims, 6 Drawing Sheets

FIG. 9

METHODS AND SYSTEMS FOR IMPROVING ESD CLAMP RESPONSE TIME

CROSS-REFERENCE TO RELATED APPLICATIONS

This application claims priority to U.S. Provisional Application No. 60/217,917, filed Jul. 13, 2000, entitled "Method for Improving ESD Clamp Response Time When Used in High Voltage Applications," which is incorporated herein by reference in its entirety.

STATEMENT REGARDING FEDERALLY-SPONSORED RESEARCH AND DEVELOPMENT

Not applicable.

BACKGROUND OF THE INVENTION

1. Field of the Invention

The invention relates to electrostatic discharge (ESD) protection and, more particularly, to methods and systems for improving response times of ESD triggering and clamping circuitry.

2. Background Art

Terminal pads, such as those found on integrated circuits (ICs), couple IC circuitry to off-chip devices. If a terminal pad is subjected to ESD, the on-chip circuitry can be damaged. For example, ESD from human handling can be as high as 2000 Volts (V). ESD circuits are utilized to redirect ESD away from on-chip circuitry, typically to ground.

In some situations, a terminal pad has a voltage present during normal operations, such as a power supply voltage, which may adversely affect ESD circuit components. Protection circuits, such as diode strings, can be used to protect ESD circuit components from becoming over stressed during normal operations, for example, when the applied voltage exceeds the voltage rating of an ESD circuit component. A protection circuit inserted between a terminal pad and an ESD circuit reduces the voltage applied to the ESD circuit.

Delayed response time is a limitation in ESD circuit performance when an ESD protection circuit is implemented as a diode string. Typical ESD circuits contain a triggering circuit that activates a clamping circuit when the ESD threshold voltage is exceeded. The clamping circuit provides an immediate discharge path, typically to ground. However, when a diode string protection circuit is inserted between a terminal pad and an ESD triggering circuit, the triggering circuit does not respond to ESD events as quickly as it would without a diode string protection circuit. The response time of the triggering circuit is delayed since each diode in the diode string contributes a series parasitic resistance which, in combination with the diode forward voltage drop, reduces the applied voltage to the ESD triggering circuit. For example, if the threshold triggering voltage is 10 V, and each diode in a string of two diodes contributes a 0.7 V forward voltage drop and a 1 V parasitic resistance voltage drop, then the triggering circuit will not activate the clamp until the applied voltage reaches 13.4 V. The diode string causes the voltage on the triggering circuit to trail behind the voltage on the terminal pad.

Initial peaking is another limitation in ESD circuit performance when the ESD protection circuit is implemented with a diode string. An ESD event is characterized by a sharp increase in voltage. Because there is no discharge path until the ESD clamp is triggered, and the response time of the ESD triggering circuit will be delayed, the applied voltage will peak higher before the threshold triggering voltage is reached.

The delayed response time and initial peaking limitations of diode string protection circuits can be alleviated if larger area diodes, which have smaller substrate resistance, are employed. However, larger area diodes require more space on the IC, which is another limitation of the diode string protection circuit.

Methods and systems are needed that enable ESD triggering and clamping circuitry to respond quickly to ESD events, yet continue to protect ESD circuit components during normal operations.

BRIEF SUMMARY OF THE INVENTION

The present invention relates to electrostatic discharge (ESD) protection and, more particularly, to methods and systems for improving response times of ESD triggering and clamping circuitry.

BRIEF DESCRIPTION OF THE FIGURES

The present invention will be described with reference to the accompanying drawings wherein.

DETAILED DESCRIPTION OF THE INVENTION

Table of Contents
I. Introduction
II. ESD Frequency Bypass
III. Example Embodiments
IV. Conclusions

I. Introduction

The present invention relates to electrostatic discharge (ESD) protection and, more particularly, to methods and systems for improving response times of ESD triggering and clamping circuitry during ESD events, without compromising the performance of ESD protection circuitry during normal operations. The present invention includes a frequency bypass to ESD protection circuits during ESD events. The invention allows sudden high voltage electrostatic spikes to bypass ESD protection circuitry and trigger ESD clamping circuitry without substantial delay.

In an embodiment, the frequency bypass circuit is a higher frequency bypass, which ensures that lower frequency fluctuations on the terminal pad do not prematurely trigger the ESD clamping circuit.

When used herein, the phrase, terminal pad, is used to refer to any type of electrical point associated with a circuit that could be subjected to an ESD event. For example, and without limitation, terminal pads include terminal pads that couple an integrated circuit (IC) device to off-chip devices, electrical connections between discreet devices, and etched and/or doped silicon connections between IC components on a chip.

There are a number of performance advantages to implementing a frequency bypass circuit in conjunction with an ESD protection circuit. The frequency bypass circuit enables the ESD triggering circuit to respond immediately to high voltage spikes caused by an ESD event. Unlike the ESD protection circuit, the frequency bypass circuit does not cause a voltage drop. Without a frequency bypass circuit, the ESD triggering circuit response time is delayed because the voltage seen by the triggering circuit trails behind the terminal pad voltage due to a voltage drop across the ESD protection circuit.

The frequency bypass circuit also suppresses initial peaking of voltage on the main circuit at the onset of an ESD event. The frequency bypass circuit enables the ESD triggering circuit to respond to high voltage electrostatic spikes without delay by activating the clamping circuit to provide a discharge path. Without an ESD protection circuit bypass, the triggering circuit response time delay can result in an initial build-up of high voltage before the clamping circuit is activated to provide a discharge path. High voltage peaking can damage ESD circuit components and main circuit components.

The frequency bypass circuit also enables ESD clamps to be used on very high voltage lines without sacrificing performance. For example, when ESD protection circuits are implemented with diode strings, the diode substrate resistance causes a voltage drop, thereby reducing the voltage level seen by the triggering circuit. In very high voltage applications, the protection circuit would require numerous diodes to afford sufficient protection from high direct current (DC) voltage stress on the circuit components. However, stringing numerous diodes together would result in significant triggering delay during ESD events, putting the IC components at greater risk. The frequency bypass circuit enables implementation of ESD protection circuits composed of numerous diodes without compromising triggering and clamping response time during ESD events.

The frequency bypass circuit also enables implementation of ESD protection circuits with smaller area diodes because diode substrate resistance will no longer impact performance of the ESD clamp during ESD events. Smaller area diodes are advantageous because they occupy less space on IC chips.

II. ESD Frequency Bypass

Figure 1:
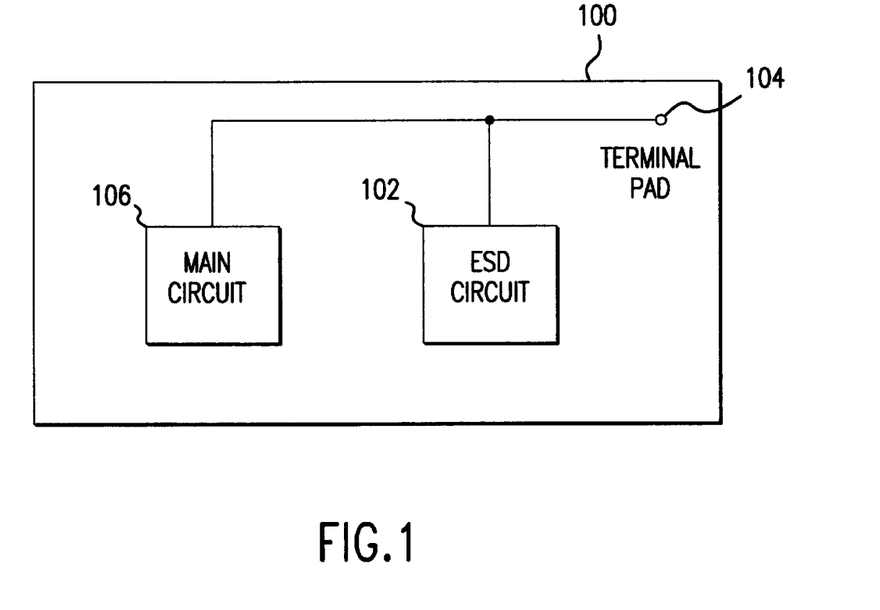
FIG. 1 is a high level block diagram illustration of an electrostatic discharge (ESD) circuit and a main circuit coupled to a terminal pad.

FIG. 1 illustrates a high level block diagram of a circuit 100, including an ESD circuit 102 coupled to a terminal pad 104 and a main circuit 106. The circuit 100 could be a single integrated circuit or multiple integrated circuits, for example, the ESD circuit 102 and main circuit 106 could be integrated onto a single chip or separate chips. Occasionally, the circuit 100 may be exposed to ESD, for example, via a terminal pad 104. The ESD circuit 102 protects the main circuit 106 from such electrostatic voltage by providing a discharge path, typically to ground.

Figure 2:
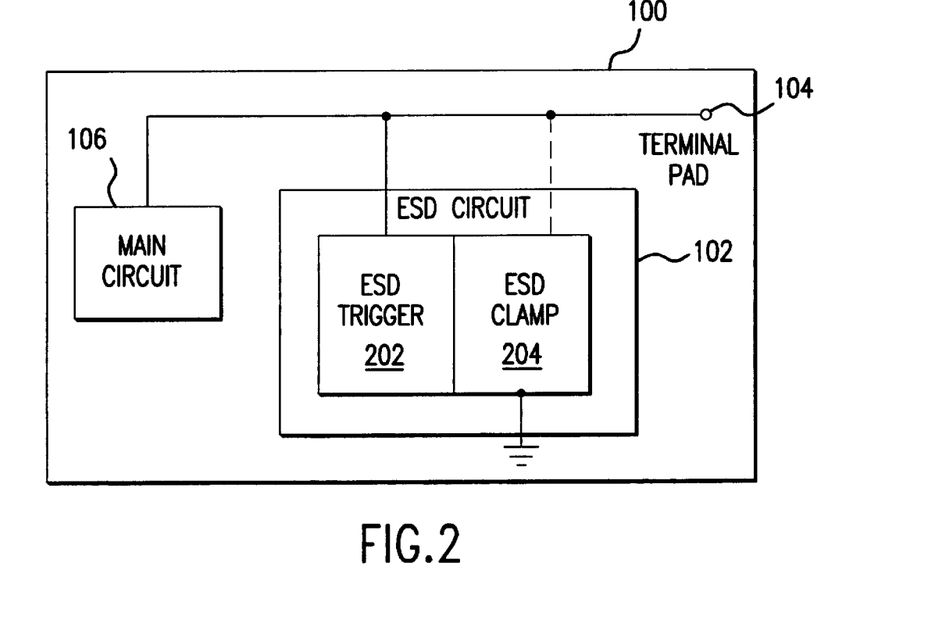
FIG. 2 is an example implementation of the ESD circuit illustrated in FIG. 1 and includes an ESD triggering circuit and an ESD clamping circuit.

FIG. 2 illustrates an example implementation of the circuit 100, wherein the ESD circuit 102 includes an ESD clamp circuit 204 and an ESD trigger circuit 202. The ESD trigger 202 and ESD clamp 204 are coupled to the terminal pad 104. The trigger circuit 202 is coupled to the clamp circuit 204, which provides a discharge path, typically to ground.

Figure 3:
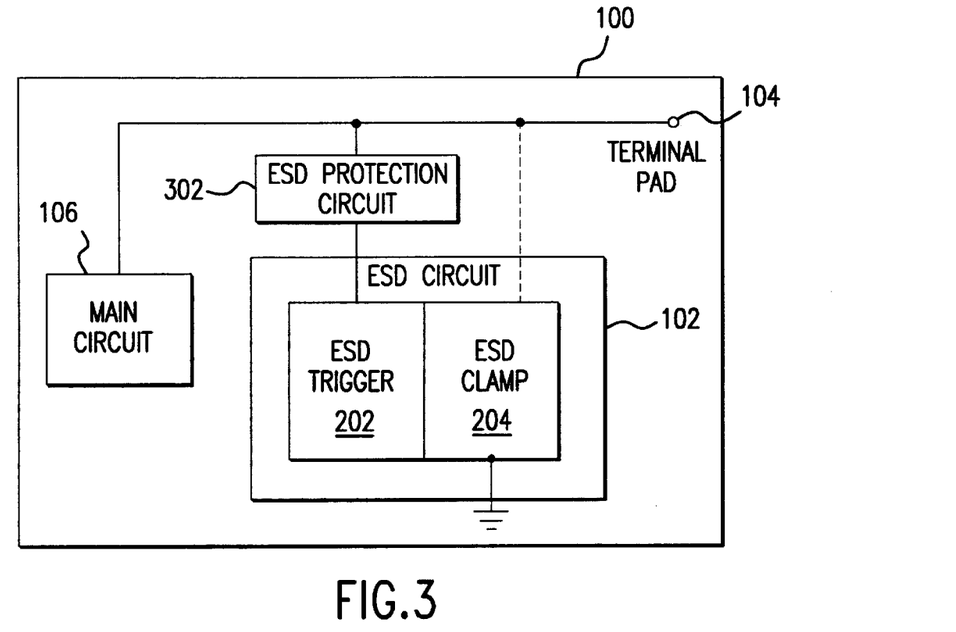
FIG. 3 is a high level block diagram illustration of an ESD protection circuit.

Sometimes during normal operations, a relatively high DC voltage, which could damage circuitry within the ESD circuit 102, may be applied the terminal pad 104. Accordingly, in an embodiment, an ESD protection circuit is implemented to reduce the DC voltage seen by the ESD circuit 102. For example, FIG. 3 is a high level block diagram illustration of an ESD protection circuit 302 coupled to the terminal pad 104 and the ESD trigger circuit 202. The ESD protection circuit 302 reduces the terminal pad voltage level sitting on the ESD circuit 102 components.

Figure 4:
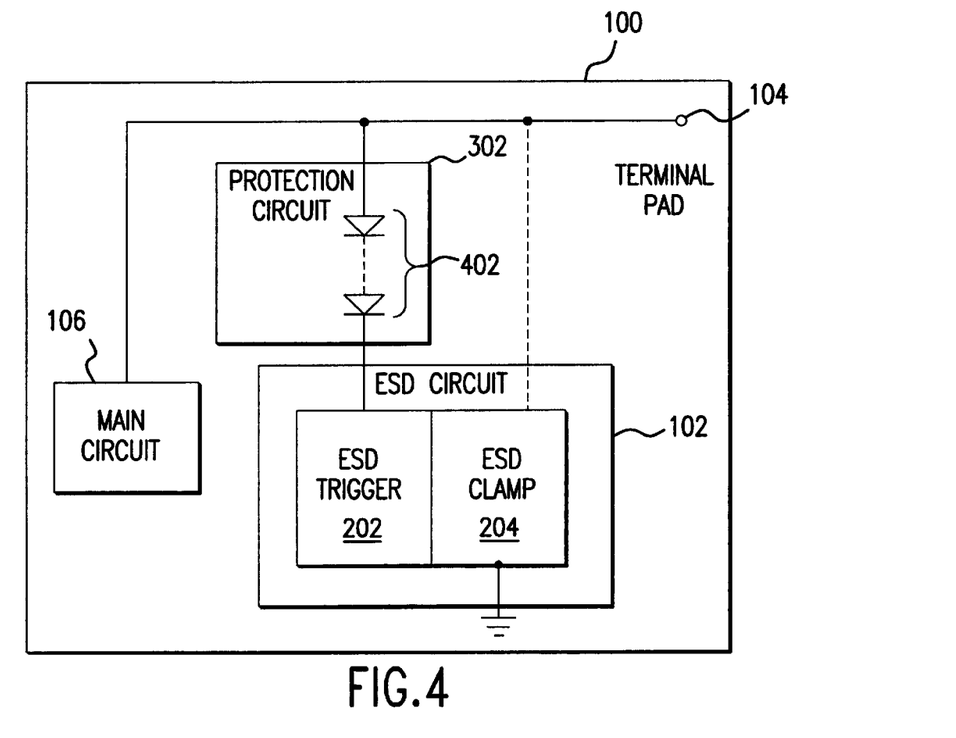
FIG. 4 is an example embodiment of the ESD protection circuit illustrated in FIG. 3.

FIG. 4 illustrates an example embodiment of the ESD protection circuit 302. In such an embodiment, a string of diodes 402 protects the components in the ESD circuit 102, for example, within the ESD trigger 202, from DC voltage stress. However, the string of diodes 402 introduces a forward voltage drop and a parasitic resistance which reduce the voltage level at the terminal pad 104 as seen by the ESD circuit 102. When an ESD event occurs, the voltage reduction due to the ESD protection circuit 302 delays the operation of the triggering circuit 202 and the clamping circuit 204. During this delay, ESD is not redirected away from the main circuit 106.

Figure 5:
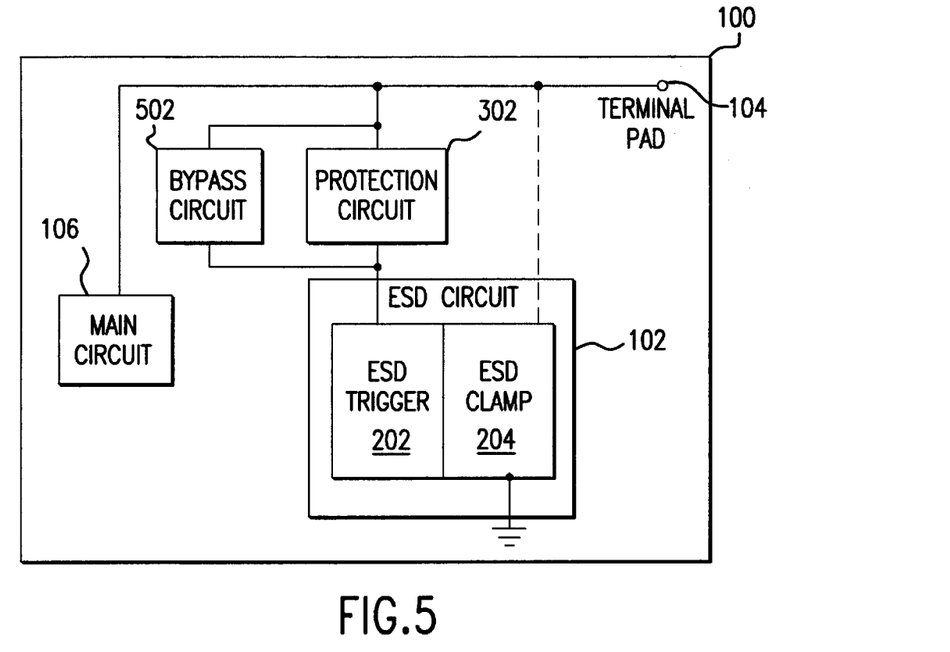
FIG. 5 is a high level block diagram illustration of a frequency bypass circuit implemented in conjunction with the ESD protection circuit of FIG. 3, in accordance with an aspect of the present invention.

A frequency bypass circuit, in accordance with the present invention, enables ESD triggering and clamping circuitry to respond quickly to ESD events, yet continue to protect ESD circuit components from DC voltage stress during normal operations. FIG. 5 is a high level block diagram illustration of the frequency bypass circuit 502 coupled to the terminal pad 104 and the ESD trigger circuit 202. The frequency bypass circuit 502 essentially acts as a short circuit between the terminal pad 104 and the ESD trigger 202 during ESD events, and essentially acts as an open circuit during normal operations.

A variety of systems and methods can be utilized to bypass ESD protection circuits in accordance with the present invention. Examples are provided below. The invention is not, however, limited to the examples provided herein. Based on the description herein, one skilled in the relevant art(s) will understand that the present invention can be implemented with other methods and systems as well.

III. Example Embodiments

Figure 6:
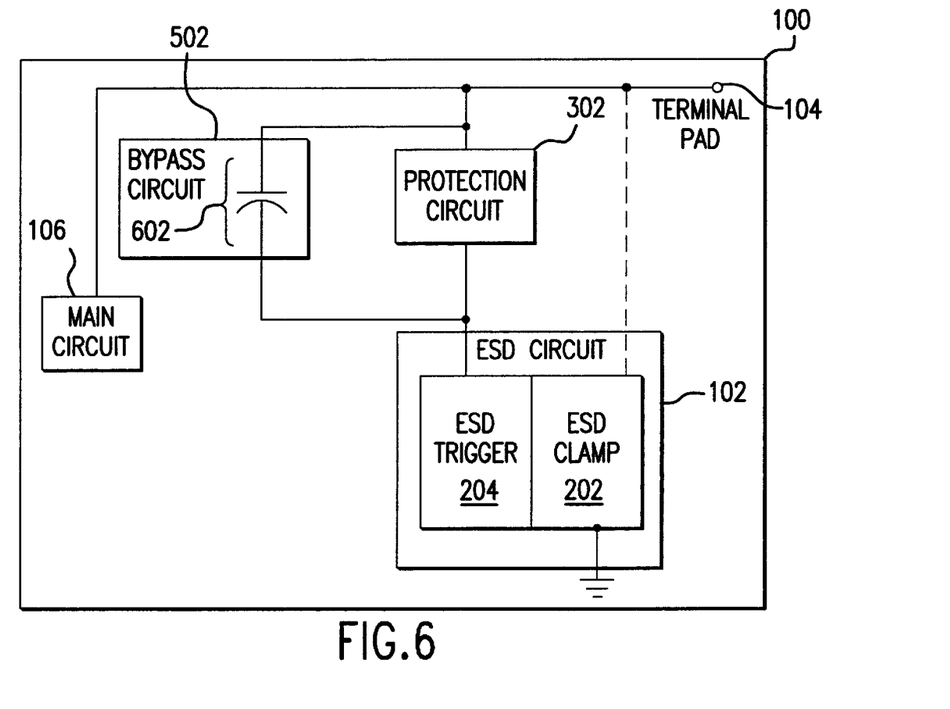
FIG. 6 illustrates an example embodiment of the frequency bypass circuit of FIG. 5.
Figure 7:
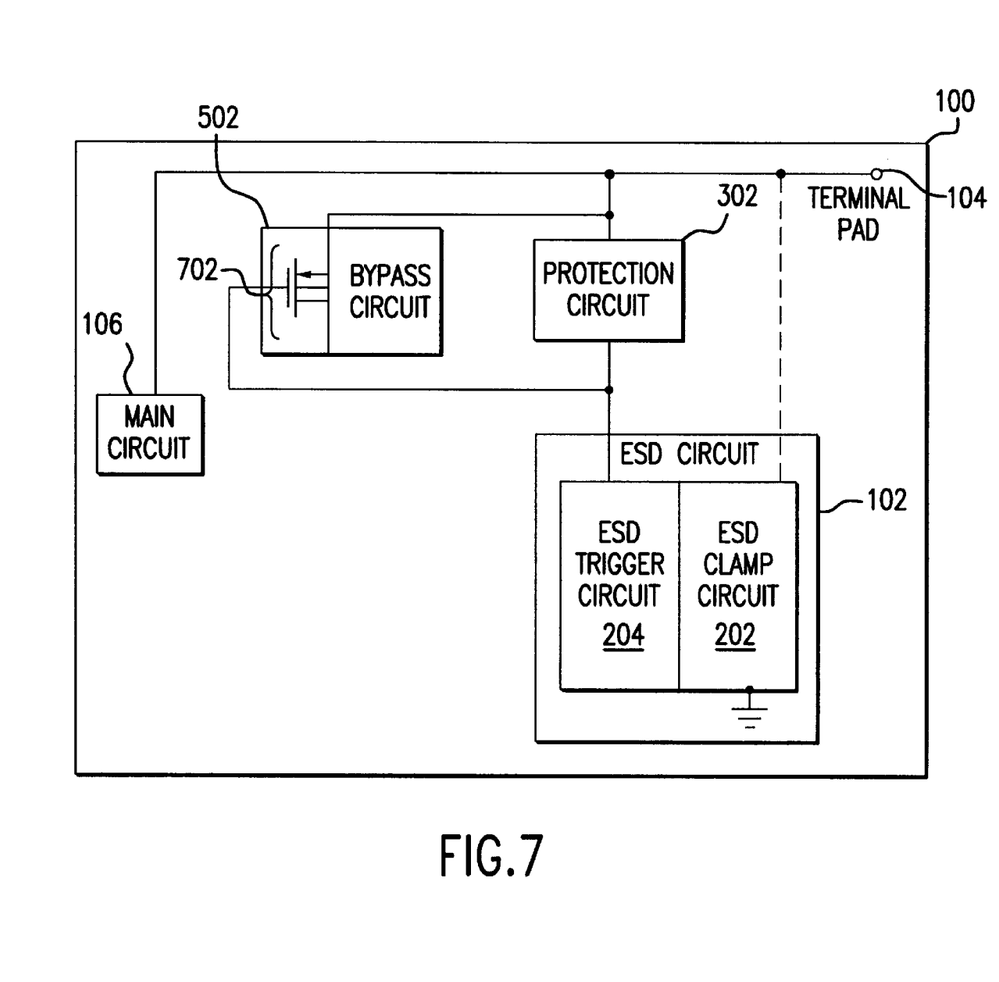
FIG. 7 illustrates another example embodiment of the frequency bypass circuit of FIG. 5.

FIG. 6 illustrates an example embodiment of the frequency bypass circuit 502 as a capacitor 602. The capacitor 602 can be implemented with one or more discreet capacitors and/or using the inherent capacitances of one or more transistors. For example, FIG. 7 illustrates the frequency bypass 502 implemented with a transistor 702 configured as a capacitor. Generally, the frequency bypass circuit 502 can be implemented with a transistor 702 configured as a capacitor if the DC voltage stress at the terminal pad 104 during normal operations is below the transistor breakdown level. Alternatively, the frequency bypass circuit 502 can be implemented with one or more discreet metal capacitors if the DC voltage stress at the terminal pad 104 during normal operations exceeds the transistor breakdown level. Components for implementing the frequency bypass may be selected according to various design considerations, for example, if lower frequency fluctuations are expected during normal operations, the frequency bypass should be implemented with components that will not pass the lower frequency fluctuations.

Figure 8:
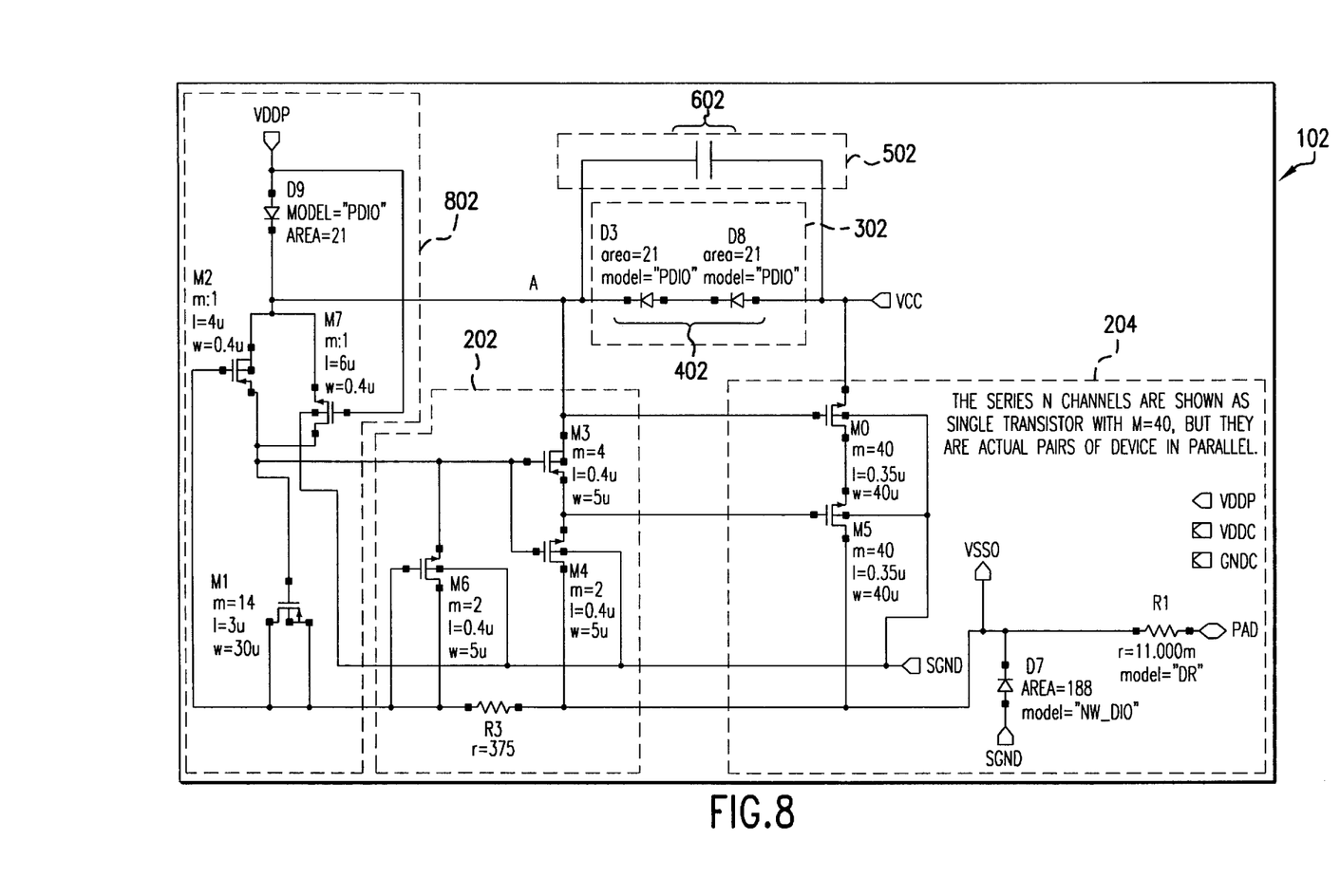
FIG. 8 is an example implementation of an ESD circuit that includes an ESD protection circuit, a frequency bypass circuit, an ESD triggering circuit, an ESD clamping circuit, and an ESD timing circuit, in accordance with an aspect of the present invention.

FIG. 8 is an example schematic diagram of the ESD circuit 102. The ESD circuit 102 includes the ESD clamp 204, ESD trigger 202, ESD protection circuit 302 configured as a string of two diodes 402, the frequency bypass circuit 502 configured as a capacitor 602, and an ESD timing circuit 802 that releases the ESD clamp after a period of time.

Figure 9:
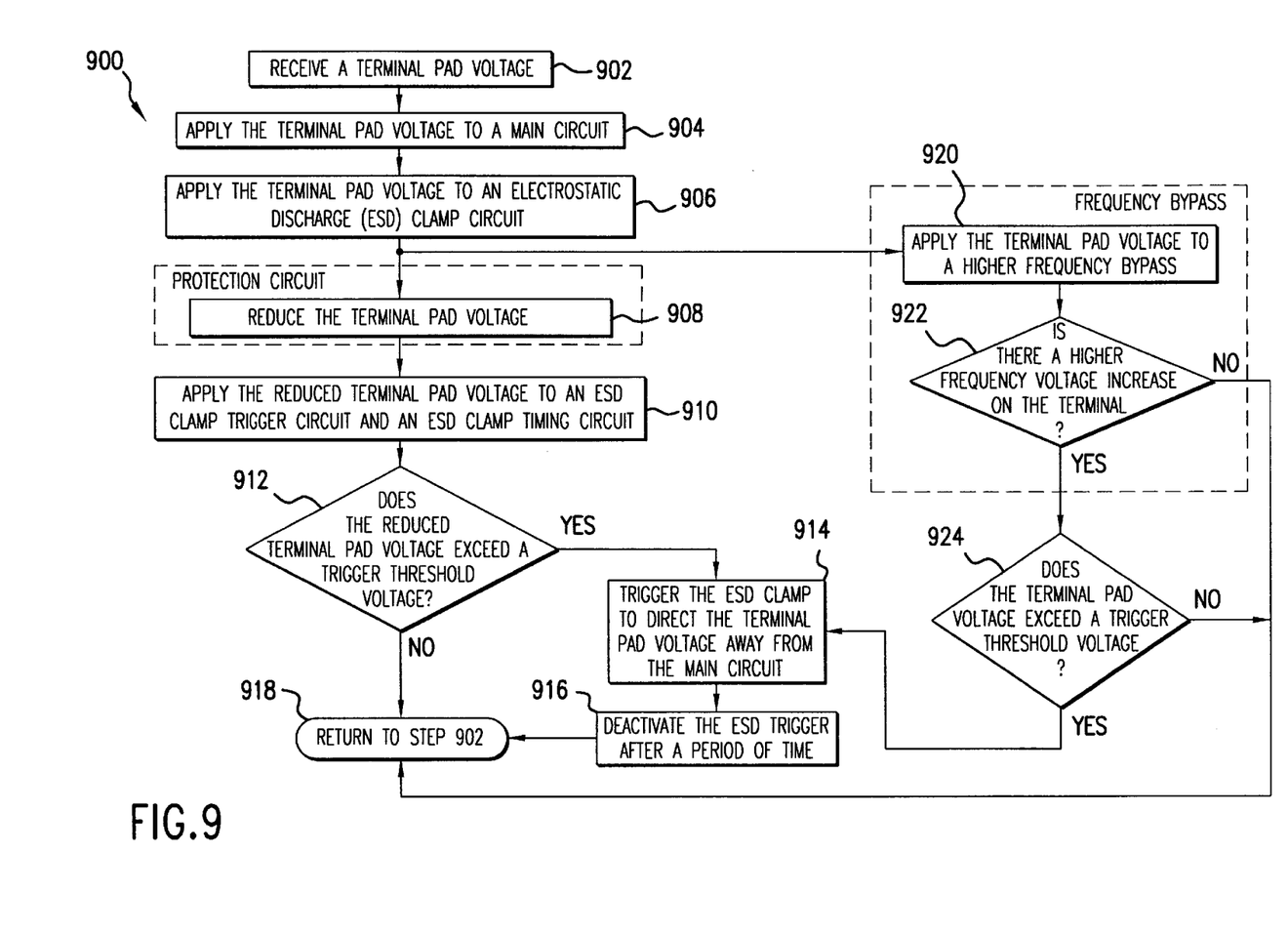
FIG. 9 illustrates a process flowchart for improving ESD triggering and clamping circuitry response time, in accordance with an aspect of the present invention.

FIG. 9 illustrates a high-level process flowchart 900 for bypassing an ESD protection circuit during an ESD event, in accordance with an aspect of the present invention. For purposes of illustration only, operation of the process flowchart 900 is described with reference to the circuit 100. Based on the description herein, one of ordinary skill in the relevant art(s) will recognize that operation of the process flowchart 900 is not, however, limited to the circuit 100. The process begins with step 902, which includes receiving the terminal pad voltage 104. The terminal pad voltage 104 is then applied to the main circuit 106 in step 904 and to the ESD circuit 102 in step 906. Steps 908 through 912 are performed in parallel with steps 920 through 924. Steps 908 through 912 are described first, followed by steps 920 through 924.

In step 908, the terminal pad voltage 104 is reduced by the ESD protection circuit 302. The reduced terminal pad voltage is applied to the ESD clamp circuit 204 and/or to the ESD trigger circuit 202 in step 910. In step 912, the ESD trigger circuit 202 determines whether the reduced terminal pad voltage exceeds the triggering voltage threshold. If the reduced terminal pad voltage exceeds a triggering threshold voltage, the ESD clamp circuit 204 is activated in step 914 and the reduced terminal pad voltage is directed away from the main circuit 106. In step 916, the ESD clamp circuit 204 is released after a period of time. In step 918, the process returns to step 902 if the reduced terminal pad voltage does not exceed a triggering voltage threshold in step 912, or after the ESD clamp circuit 204 is released in step 916.

In step 920, the unreduced terminal pad voltage 104 is applied to a higher frequency bypass 502, in accordance with an aspect of the present invention. In step 922, the higher frequency bypass 502 determines whether there is a higher frequency voltage increase on the terminal. If a higher frequency voltage increase is detected, and the voltage exceeds a triggering threshold voltage in step 924, the ESD clamp circuit 204 is activated in step 914 and the terminal pad voltage is directed away from the main circuit 106. In step 916, the ESD clamp circuit 204 is released after a period of time. In step 918, the process returns to step 902 if the higher frequency bypass 502 does not detect a higher frequency voltage increase on the terminal in step 922, or if the higher frequency bypass 502 detects a higher frequency voltage increase on the terminal in step 922 but the voltage does not exceed a triggering threshold voltage in step 924, or after the ESD clamp circuit 204 is released in step 916.

X. Conclusions

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discreet components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for redirecting electrostatic discharge (ESD) away from a main circuit coupled to a terminal pad, comprising the steps of:
   (1) receiving a terminal pad voltage;
   (2) applying said terminal pad voltage to a main circuit;
   (3) applying said terminal pad voltage to an ESD clamp circuit;
   (4) applying a reduced terminal pad voltage to an ESD trigger circuit;
   (5) triggering said ESD clamp circuit to direct said terminal pad voltage away from said main circuit when said reduced terminal pad voltage exceeds an ESD triggering threshold voltage;
   (6) applying said terminal pad voltage to a higher frequency bypass; and
   (7) triggering said ESD clamp circuit through said higher frequency bypass to direct said terminal pad voltage away from said main circuit when there is a higher frequency voltage increase on said terminal pad.

2. The method according to claim 1, wherein steps (4) and (5) are executed in parallel with steps (6) and (7).

3. The method according to claim 1, wherein step (4) comprises the step of applying said reduced terminal pad voltage to an ESD timing circuit that releases said ESD clamp circuit after a period of time.

4. A system for redirecting electrostatic discharge (ESD) away from a main circuit coupled to a terminal pad, comprising:
   an ESD circuit coupled to said terminal pad;
   an ESD protection circuit coupled between said terminal pad and said ESD circuit; and
   a frequency bypass circuit coupled between said terminal pad and said ESD circuit;
   whereby said ESD protection circuit reduces said terminal pad voltage during normal operation and said frequency bypass circuit provides an ESD protection circuit bypass during at least an initial portion of an ESD event.

5. The system according to claim 4, wherein said ESD protection circuit includes one or more diodes.

6. The system according to claim 4, wherein said frequency bypass circuit includes one or more discreet capacitors.

7. The system according to claim 4, wherein said frequency bypass circuit includes one or more transistor-based capacitors.

8. An electrostatic discharge (ESD) circuit, comprising:
   a terminal pad;
   an ESD clamping circuit coupled to said terminal pad;
   an ESD triggering circuit coupled to said ESD clamping circuit;
   an ESD protection circuit coupled between said terminal pad and said ESD triggering circuit; and
   a frequency bypass circuit coupled between said terminal pad and said ESD clamping circuit;
   whereby said ESD protection circuit reduces said terminal pad voltage during normal operations and said frequency bypass circuit provides an ESD protection circuit bypass during at least an initial portion of an ESD event.

9. The electrostatic discharge circuit (ESD) according to claim 8, wherein said ESD protection circuit includes one or more diodes.

10. The electrostatic discharge circuit (ESD) according to claim 8, wherein said frequency bypass circuit includes one or more discreet capacitors.

11. The electrostatic discharge circuit (ESD) according to claim 8, wherein said frequency bypass circuit includes one or more transistor-based capacitors.

12. A system for redirecting electrostatic discharge (ESD) away from a main circuit coupled to a terminal pad, comprising:

an ESD clamp that provides a discharge path;

an ESD trigger that activates said ESD clamp during an ESD event;

an ESD protection circuit that reduces terminal pad voltage applied to said ESD trigger during normal operations; and a frequency bypass circuit that bypasses said ESD protection circuit during at least an initial portion of an ESD event.

13. The system according to claim 12, wherein said ESD protection circuit includes one or more diodes.

14. The system according to claim 12, wherein said frequency bypass circuit includes one or more discreet capacitors.

15. The system according to claim 12, wherein said frequency bypass circuit includes one or more transistor-based capacitors.

16. A system for redirecting electrostatic discharge (ESD) away from a main circuit coupled to a terminal pad, comprising:

means for receiving a terminal pad voltage;

ESD clamp means for discharging ESD from said terminal pad;

ESD trigger means for triggering said ESD clamp means during an ESD event;

terminal pad voltage reducing means for reducing a terminal pad voltage applied to said ESD trigger means;

frequency bypass means for bypassing said terminal pad voltage reducing means at least during an initial portion of an ESD event.

17. A method for redirecting electrostatic discharge (ESD) away from a main circuit, comprising the steps of:

(1) connecting an ESD protection circuit to a terminal pad;

(2) connecting an ESD circuit to said ESD protection circuit; and (3) connecting a frequency bypass circuit between said terminal pad and said ESD circuit;

whereby said frequency bypass circuit provides a bypass across said ESD protection circuit during at least an initial portion of an ESD event.

18. The method according to claim 17, wherein step (2) comprises the step of connecting one or more diodes between said terminal pad and said ESD circuit.

19. The method according to claim 17, wherein step (3) comprises the step of connecting one or more capacitors between said terminal pad and said ESD circuit.

20. The method according to claim 19, wherein step (3) further comprises the step of connecting one or more discreet capacitors between said terminal pad and said ESD circuit.

21. The method according to claim 19, wherein step (3) further comprises the step of connecting one or more transistor-based capacitors between said terminal pad and said ESD circuit.

* * * * *